United States Patent
Kotake

(10) Patent No.: US 11,926,274 B2
(45) Date of Patent: Mar. 12, 2024

(54) FRONT BUMPER

(71) Applicants: TOYOTA JIDOSHA KABUSHIKI KAISHA, Aichi-ken (JP); SUBARU CORPORATION, Tokyo (JP)

(72) Inventor: Shota Kotake, Toyota (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 141 days.

(21) Appl. No.: 17/711,618

(22) Filed: Apr. 1, 2022

(65) Prior Publication Data

US 2022/0314914 A1    Oct. 6, 2022

(30) Foreign Application Priority Data

Apr. 5, 2021   (JP) ................. 2021-064091

(51) Int. Cl.
   *B60R 19/48*   (2006.01)
(52) U.S. Cl.
   CPC .................. *B60R 19/483* (2013.01)
(58) Field of Classification Search
   CPC ....... B60R 19/483; B60R 19/02; B60R 19/18; B60R 19/24; B60R 19/26; B60R 19/34; B60R 2019/1806
   See application file for complete search history.

(56) References Cited

U.S. PATENT DOCUMENTS

| | | | | |
|---|---|---|---|---|
| 3,794,997 | A * | 2/1974 | Iwatsuki | ............... B60R 21/013 342/72 |
| 8,517,454 | B1 * | 8/2013 | Huber | ..................... B60R 19/18 293/121 |
| 9,932,004 | B1 * | 4/2018 | Mihm | ..................... B60R 19/18 |
| 11,285,897 | B2 * | 3/2022 | Schulz | ..................... B60R 11/00 |
| 2004/0124643 | A1 | 7/2004 | Matsumoto et al. | |
| 2011/0031769 | A1 * | 2/2011 | Loeffler | .................. B60R 19/04 293/146 |

(Continued)

FOREIGN PATENT DOCUMENTS

| JP | 2004203158 A | 7/2004 |
|---|---|---|
| JP | 2015136947 A | 7/2015 |

(Continued)

OTHER PUBLICATIONS

Computer generated translation of KR 10-2012-0029950 (Year: 2012).*

*Primary Examiner* — Gregory A Blankenship
(74) *Attorney, Agent, or Firm* — HAUPTMAN HAM, LLP

(57) ABSTRACT

A front bumper includes a bumper body and a bumper inner. The bumper body is exposed to the outside of a vehicle. The bumper inner is located inside the bumper body. The bumper inner includes an inner body that extends in a lateral direction of the vehicle along an inner surface of the bumper body, and at least one bumper stay that extends from the inner body toward a body of the vehicle and that is fixed to the body. The bumper stay includes a base plate that is joined to the body, and a reinforcing wall that extends in a vertical direction from a peripheral edge of the base plate. The inner body includes a cut along either or both of upper and lower edges of the inner body that extend in the lateral direction, the cut extending in a range including a position closest to the bumper stay.

9 Claims, 3 Drawing Sheets

(56) References Cited

U.S. PATENT DOCUMENTS

| | | | |
|---|---|---|---|
| 2012/0000302 A1* | 1/2012 | Inoue | G01S 7/521 |
| | | | 73/866.5 |
| 2012/0007764 A1* | 1/2012 | Kawasaki | B60R 19/483 |
| | | | 342/70 |
| 2014/0070982 A1* | 3/2014 | Inada | B60R 19/483 |
| | | | 342/385 |
| 2014/0152029 A1* | 6/2014 | Taniguchi | B60R 19/56 |
| | | | 293/102 |
| 2017/0129430 A1 | 5/2017 | Aizawa et al. | |
| 2017/0253203 A1* | 9/2017 | Nusier | B60R 19/18 |
| 2019/0162845 A1* | 5/2019 | Yasui | G01S 15/931 |
| 2019/0219689 A1* | 7/2019 | Fujita | B60R 19/483 |
| 2019/0315299 A1* | 10/2019 | Bader | B60R 19/03 |
| 2020/0361398 A1* | 11/2020 | Nakajima | B60R 11/04 |
| 2021/0094494 A1* | 4/2021 | Carrillo Fernandez | |
| | | | B60R 19/483 |
| 2022/0314910 A1* | 10/2022 | Kotake | B60R 19/12 |
| 2022/0314914 A1* | 10/2022 | Kotake | B60R 19/483 |

FOREIGN PATENT DOCUMENTS

| | | | | |
|---|---|---|---|---|
| JP | 201787942 A | | 5/2017 | |
| KR | 10-2012-0029950 | * | 9/2012 | B60R 19/03 |

\* cited by examiner

FRONT BUMPER

CROSS-REFERENCE TO RELATED APPLICATION

This application claims priority to Japanese Patent Application No. 2021-064091 filed on Apr. 5, 2021, incorporated herein by reference in its entirety.

BACKGROUND

1. Technical Field

The technique disclosed herein relates to front bumpers. More particularly, the technique disclosed herein relates to a front bumper including a bumper body exposed to the outside of a vehicle and a bumper inner that fixes the bumper body to a body of the vehicle.

2. Description of Related Art

Japanese Unexamined Patent Application Publication No. 2004-203158 (JP 2004-203158 A) discloses a front bumper including a bumper body (referred to as "bumper face" in JP 2004-203158 A) and a bumper inner (referred to as "reinforcing member" in JP 2004-203158 A). A plurality of fixing portions of the bumper inner and a plurality of fixing portions of a body (e.g., an undercover) are connected by thick portions of the bumper inner. This configuration reduces deformation of the lower part of the bumper body by the rigidity of the fixing portions of both the bumper inner and the body when a pedestrian collides with the bumper body.

SUMMARY

A bumper body that is an exterior panel needs to be attached to other adjacent parts such as a body and other exterior parts without excessive gaps in order to improve the appearance of a vehicle. For that purpose, it is important to properly hold the bumper body in position, and it is required that the bumper body be firmly fixed to the body. As described above, the bumper body is fixed to the body via a bumper inner. The bumper inner includes a bumper stay that extends toward the body. In this case, since one end of the bumper stay is fixed to the body, the bumper stay is in the form of a so-called cantilever and supports the bumper body. Therefore, the bumper body fixed to the body by the bumper stay tends to be displaced downward due to the weight of the bumper body itself. In order to prevent this deformation, it is effective to reinforce the bump stay. One particular way to reinforce the bump stay is to provide a vertically extending reinforcing wall along the peripheral edge of a base plate of the bumper stay that is joined to the body.

The reinforced bumper stay is connected to an inner body that supports the bumper body. The inner body extends in a lateral direction of the vehicle along inside of the bumper body. Therefore, the inner body can support the bumper body from the inside along the entire length of the inner body in the lateral direction of the vehicle. A front bumper including the reinforced bumper stay and the inner body that supports the bumper body along the entire length of the inner body in the lateral direction of the vehicle can thus properly hold the entire bumper body in position.

However, the bumper stay with the reinforcing wall has high rigidity. Moreover, the inner body that is long in the lateral direction of the vehicle also needs to have a certain degree of rigidity in order to reduce downward bending and twisting at both ends of the inner body. As a result, the rigidity of the front bumper tends to be locally increased around the bumper stay by both the bumper stay and the inner body. If the bumper stay located inside the front bumper has locally high rigidity, the reaction force to an external force may be locally large when the external force is applied to the front bumper. This specification provides a technique that can restrain the overall rigidity of a bumper inner including an inner body and a bumper stay from becoming locally high around the bumper stay while increasing the rigidity of the bumper stay.

A front bumper according to one aspect disclosed herein is mounted on a front part of a vehicle. The front bumper includes a bumper body and a bumper inner. The bumper body is exposed to outside of the vehicle. The bumper inner is located inside the bumper body. The bumper inner includes an inner body that extends in a lateral direction of the vehicle along an inner surface of the bumper body, and at least one bumper stay that extends from the inner body toward a body of the vehicle and that is fixed to the body. The at least one bump stay includes a base plate that is joined to the body, and a reinforcing wall that extends in a vertical direction from a peripheral edge of the base plate. The inner body includes a cut along either or both of upper and lower edges of the inner body that extend in the lateral direction, the cut extending in a range including a position closest to the at least one bumper stay.

In the above front bumper, the cut is formed so as to match the position of the bumper stay. The cut is formed along either or both of the upper and lower edges of the inner body and extends in the range including the position closest to the bumper stay. According to such a configuration, rigidity of the bumper inner is locally reduced around the bumper stay with high rigidity. As a result, the overall rigidity of the bumper inner including the inner body and the bumper stay can be restrained from becoming locally high around the bumper stay. Since the cut in the inner body is located around the bumper stay, the rigidity required for the inner body is not excessively reduced. That is, even though the inner body that is long in the lateral direction of the vehicle has a cut near the bumper stay, downward bending or twisting at both ends of the inner body is less likely to be amplified.

Details and further improvements of the technique disclosed herein will be described in the "DETAILED DESCRIPTION OF EMBODIMENTS" section below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
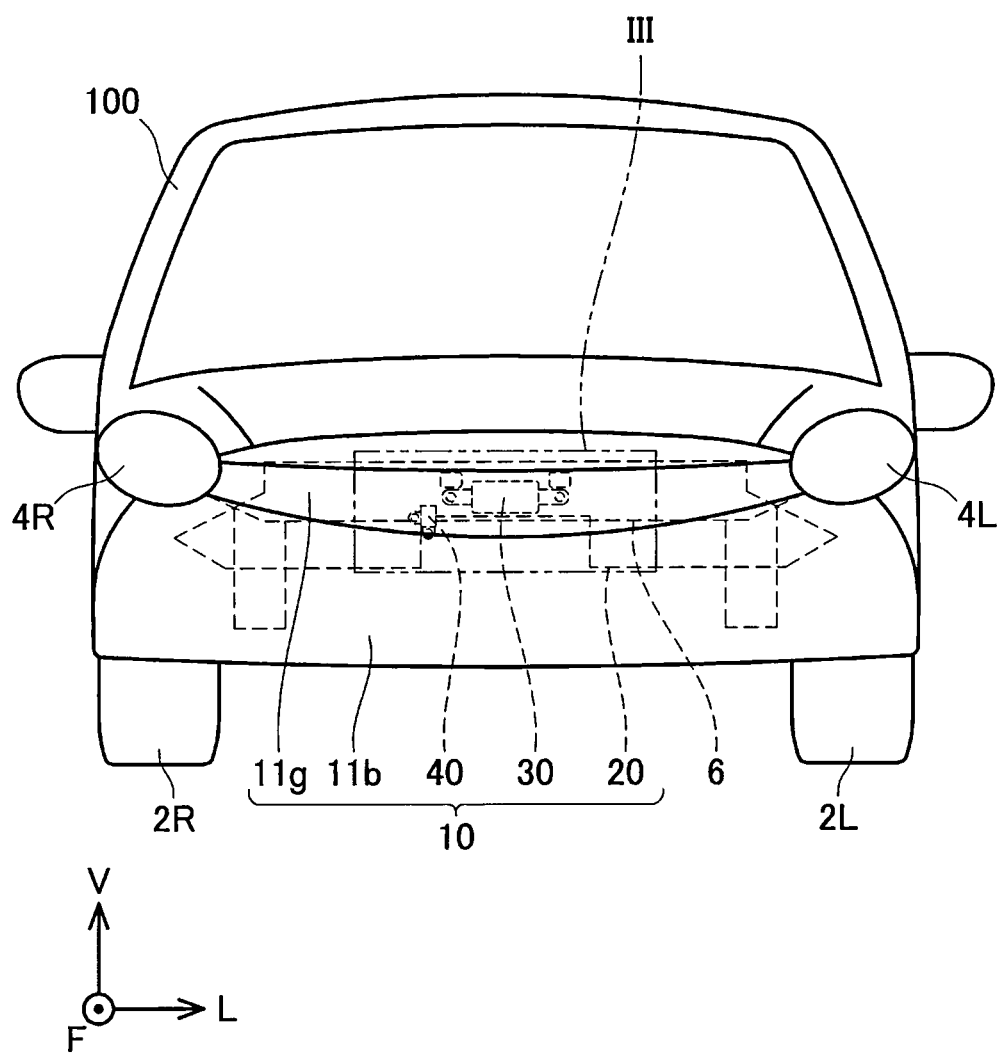
FIG. 1 is a front view of a vehicle equipped with a front bumper of an embodiment.

In one embodiment of the present technique, the reinforcing wall may extend along both side edges located on both sides in the lateral direction out of the peripheral edge of the base plate. According to such a configuration, the rigidity of the bumper stay is increased, and the bumper body can be more properly held in position. In another embodiment, the reinforcing wall may extend along entirety of the peripheral edge of the base plate.

In one embodiment of the present technique, the at least one bumper stay may be a pair of bumper stays located next to each other in the lateral direction. For example, in a configuration in which the bumper inner includes only one bumper stay, the bumper stay tends to be subjected to a twisting moment. As a result, the position of the bumper body tends to be displaced. According to such a configuration, since the pair of bumper stays reduces generation of a twisting moment to the bumper stays, the bumper body can be more properly held in position.

In one embodiment of the present technique, the cut may be continuous from a position closest to one of the bumper stays to a position closest to the other bumper stay. Since the portion between the bumper stays is affected by the bumper stays, the rigidity of the bumper inner tends to increase even at positions that are not close to the bumper stays. The rigidity of the bumper inner can therefore be appropriately reduced by forming the cut of the inner body that is continuous between the bumper stays.

In one embodiment of the present technique, the cut may be located along the lower edge of the inner body. In another embodiment, the cut may be located along the upper edge of the inner body.

In one embodiment of the present technique, the front bumper may further include at least one electronic device located between the bumper body and the inner body. In that case, at least a part of the at least one electronic device may be exposed from the cut. According to such a configuration, the exposed part of the electronic device can be accessed via the bumper inner. That is, maintenance can be performed on the electronic device without removing the bumper inner. This facilitates the maintenance of the electronic device.

In one embodiment of the present technique, the bumper body may include a base that protrudes toward the inner body. The at least one electronic device may be fixed to the base. In that case, the front bumper may further include a cover. The cover may be attached to the bumper body from the outside and may cover the base from the outside. According to such a configuration, since the base to which the electronic device is fixed can be covered by the cover, flexibility in shape of the base can be improved.

In one embodiment of the present technique, the at least one electronic device may include a millimeter wave radar. In another embodiment, the at least one electronic device may include an antenna that receives radio waves for remote control of the vehicle.

In one embodiment of the present technique, the at least one electronic device may include a camera that captures an image of area in front of the vehicle. In another embodiment, the at least one electronic device may include an antenna that receives radio waves for remote control of the vehicle.

A front bumper according to an embodiment will be described with reference to the drawings. First, a vehicle 100 equipped with a front bumper 10 of the embodiment will be described with reference to FIG. 1. In the following description, regarding the vertical direction of the vehicle 100, the upward direction (i.e. the direction of arrow V in the drawings) is sometimes simply referred to as "upper," and the opposite direction, namely the downward direction, is sometimes simply referred to as "lower." Regarding the lateral direction of the vehicle 100, the leftward direction as viewed from an occupant in a cabin of the vehicle 100 (that is, the direction of arrow L in the drawings) is sometimes simply referred to as "left," and the opposite direction is sometimes simply referred to as "right." Similarly, regarding the longitudinal direction of the vehicle 100, the forward direction (i.e. the direction of arrow F in the drawings) is sometimes simply referred to as "front," and the opposite direction, namely the rearward direction, is sometimes simply referred to as "rear."

FIG. 1 shows a front part of the vehicle 100. The vehicle 100 includes a pair of wheels 2R, 2L, a pair of headlights 4R, 4L, a body 6, and the front bumper 10. The vehicle 100 travels by driving the wheels 2R, 2L. The headlights 4R, 4L are lights that illuminate the area in front of the vehicle 100. The body 6 is a sheet metal component forming a structure that protects the cabin (not shown) of the vehicle 100.

The front bumper 10 is a so-called exterior component that is mounted on the front part of the vehicle 100, and is mainly made of resin. The front bumper 10 includes a bumper body 11b, a cover 11g, a bumper inner 20, a millimeter wave radar 30, and a camera 40. As described in detail later with reference to FIG. 2, the front bumper 10 is fixed to the body 6 of the vehicle 100 via the bumper inner 20. The bumper body 11b is a resin component exposed on the front part of the vehicle 100. The cover 11g is attached to the bumper body 11b from the outside (i.e., the side closer to the viewer of FIG. 1). The millimeter wave radar 30 is an electronic device for detecting an obstacle located in front of the vehicle 100. The camera 40 is an electronic device for capturing an image of the area in front of the vehicle 100. Since the detailed structures of the millimeter wave radar 30 and the camera 40 are known in the art, description thereof will be omitted.

The structure of the front bumper 10 will be described in detail with reference to FIG. 2. The bumper body 11b has in its upper part a base 13 extending in the lateral direction of the vehicle 100. Structures such as a plurality of bosses 16 are located on the base 13. First, the electronic devices (i.e., the millimeter wave radar 30 and the camera 40) are fixed to the back surface of the base 13 (i.e., the opposite surface of the base 13 from the viewer of FIG. 2). Next, the bumper inner 20 is fixed to the back surface of the base 13 of the bumper body 11b.

The bumper inner 20 includes an inner body 20b, a pair of bumper stays 22R, 22L, and a plurality of through holes 26. The inner body 20b extends in the lateral direction of the vehicle 100 (i.e., the horizontal direction of FIG. 2) and has a cut 21 along the middle part of its lower edge. Bolts 60 are inserted through the through holes 26 of the inner body 20b. Each bolt 60 passes through a corresponding one of the through holes 26 and is screwed into a corresponding one of the bosses 16. The bumper inner 20 is thus fixed to the bumper body 11b.

The cover 11g made of resin is then attached from the front side of the bumper body 11b so as to cover the base 13. Although not shown in the figures, the cover 11g is fixed by fitting resin clips, tabs, etc. into through holes of the base 13. The front bumper 10 is thus completed.

Figure 2:
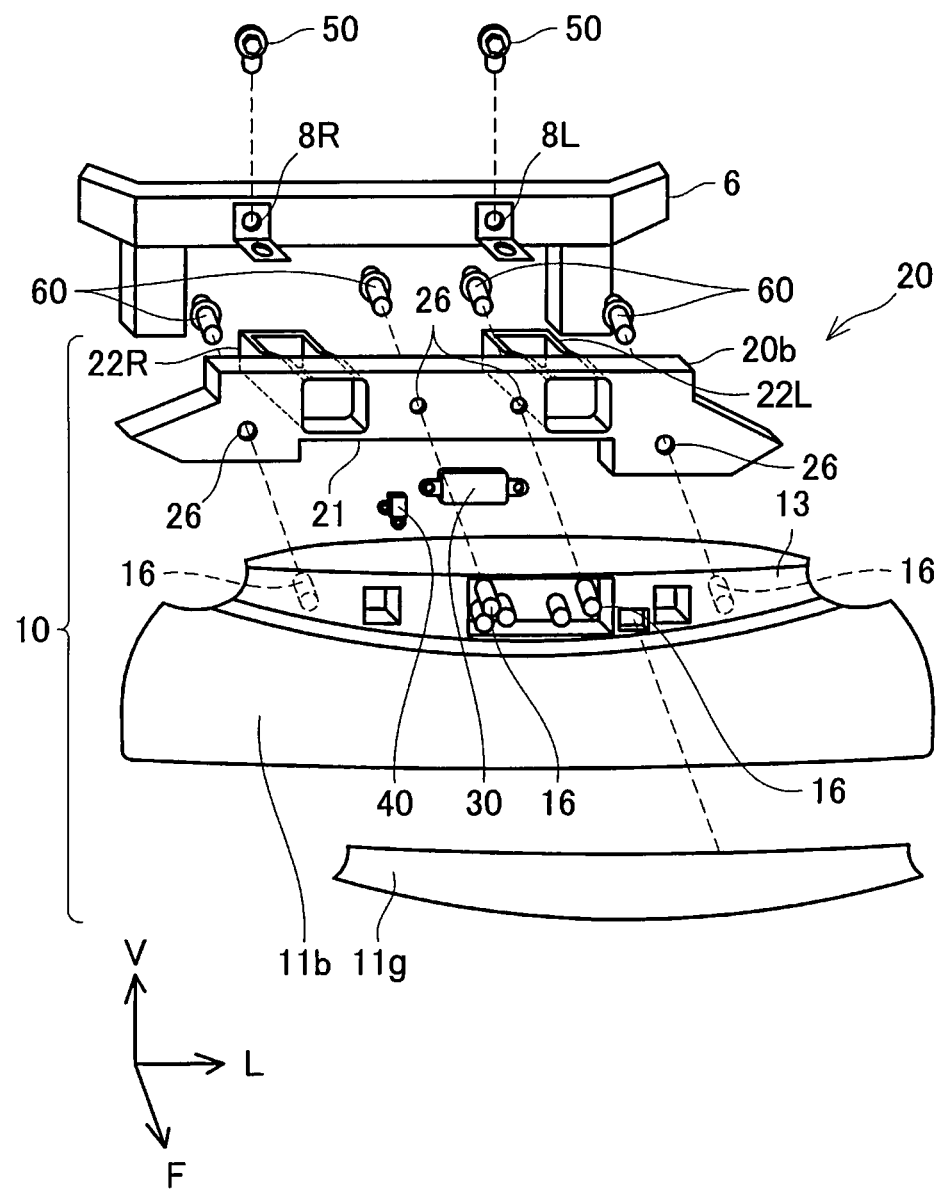
FIG. 2 is an exploded perspective view of the front bumper of the embodiment.

As shown in FIG. 2, the body 6 of the vehicle 100 (see FIG. 1) includes a body portion extending in the lateral direction of the vehicle 100 and leg portions. The body 6 includes a pair of brackets 8R, 8L. The brackets 8R, 8L are welded to the body portion of the body 6. Each of the brackets 8R, 8L has a bottom surface extending forward toward the front bumper 10. The bottom surface of each bracket 8R, 8L has a through hole.

The bumper stays 22R, 22L of the inner body 20b are located so as to face the brackets 8R, 8L in the longitudinal direction of the vehicle 100, respectively. Specifically, the right bumper stay 22R located on the right side (i.e., the left side of FIG. 2) out of the bumper stays 22R, 22L faces the right bracket 8R located on the right side out of the brackets 8R, 8L in the longitudinal direction of the vehicle 100. Similarly, the left bumper stay 22L located on the left side (i.e., the right side of FIG. 2) faces the left bracket 8L located on the left side in the longitudinal direction of the vehicle 100.

The completed front bumper 10 is brought closer to the body 6 from the front (i.e., the side closer to the viewer of FIG. 2) so that the lower surfaces of the bumper stays 22R, 22L contact the bottom surfaces of the brackets 8R, 8L, respectively. The bumper stays 22R, 22L and the brackets 8R, 8L facing the bumper stays 22R, 22L are then fastened together from above by bolts 50, respectively. Although not shown in the figures, the bumper inner 20 of the front bumper 10 of the embodiment is also fastened to the headlights 4R, 4L (see FIG. 1) at its both ends in the lateral direction of the vehicle 100. The front bumper 10 is thus mounted on the vehicle 100 via the bumper inner 20.

Figure 3:
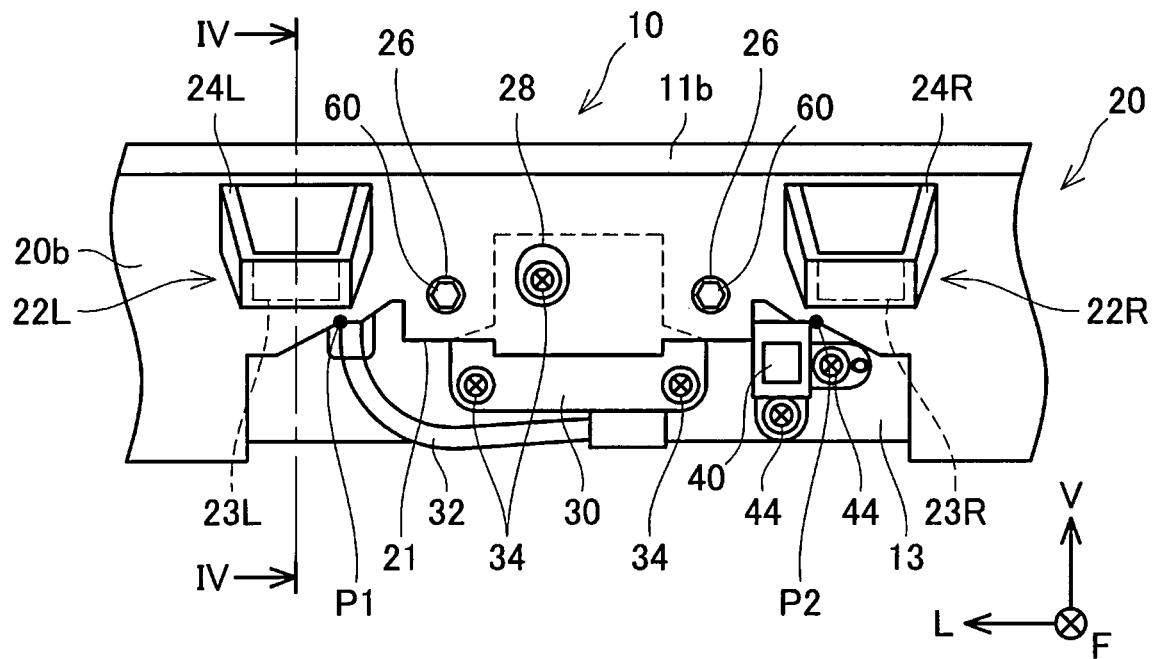
FIG. 3 is an enlarged rear view of the area surrounded by long dashed double-short dashed line III in FIG. 1.

The detailed structure around the bumper stays 22R, 22L will be described with reference to FIGS. 3 and 4. FIG. 3 is an enlarged view of the structure around the bumper stays 22R, 22L of the front bumper 10 removed from the body 6 (see FIG. 2), as viewed from the rear. The left bumper stay 22L located on the left side out of the bumper stays 22R, 22L will be mainly described below. However, the right bumper stay 22R located on the right side also has a similar shape.

As described earlier, the left bumper stay 22L extends rearward from the inner body 20b toward the body 6. As shown in FIG. 3, the inner body 20b is fixed to the base 13 of the bumper body 11b by the bolts 60. The inner body 20b supports the bumper body 11b from the inside. As shown in FIG. 4, the rear end of the left bumper stay 22L extending rearward from the inner body 20b is fixed to the left bracket 8L by the bolt 50. The bumper body 11b is thus fixed to the body 6 of the vehicle 100 by the bumper inner 20.

Figure 4:
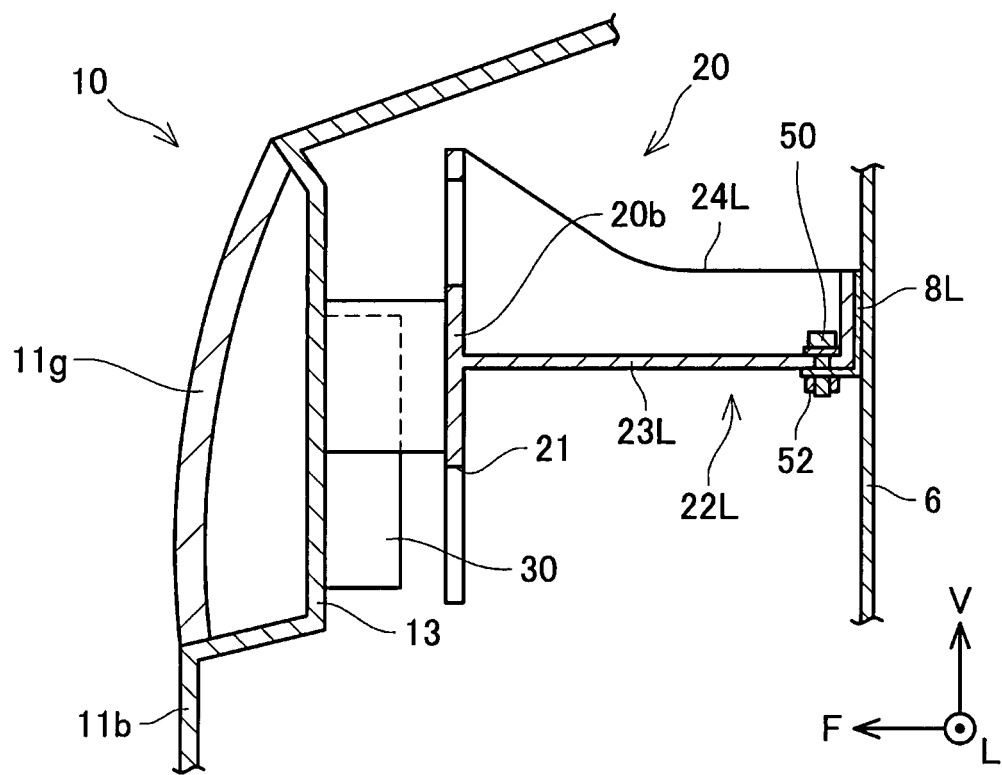
FIG. 4 is a sectional view taken along line IV-IV in FIG. 3.

Therefore, as shown in FIG. 4, the bumper body 11b having a hollow shape is not directly supported by the body 6. The left bumper stay 22L of the bumper inner 20 is thus in the form of a so-called cantilever and supports the bumper body 11b. Accordingly, the bumper body 11b tends to be displaced downward due to the weight of the bumper body 11b itself.

The left bumper stay 22L therefore includes a left reinforcing wall 24L in addition to a left base plate 23L fastened (i.e., joined) to the left bracket 8L by the bolt 50. The left reinforcing wall 24L is a wall extending in the vertical direction from the peripheral edge of the left base plate 23L. As shown in FIG. 4, the left reinforcing wall 24L extends more upward toward the inner body 20b. That is, the height of the left reinforcing wall 24L increases as it gets closer to the base of the left reinforcing wall 24L. The left reinforcing wall 24L reinforces the left bumper stay 22L. The left reinforcing wall 24L particularly reduces downward displacement of the front part of the left bumper stay 22L. As a result, the left reinforcing wall 24L can reduce the downward displacement of the bumper body 11b. That is, the left bumper stay 22L can properly hold the bumper body 11b in position by the left reinforcing wall 24L. Since the bumper body 11b is not displaced downward, the bumper body 11b can be attached to, for example, the headlights 4R, 4L (see FIG. 1) without an excessive gap. As a result, the appearance of the structure around the bumper body 11b is improved.

As shown in FIG. 3, the left reinforcing wall 24L extends along the entire peripheral edge of the left base plate 23L. That is, the left reinforcing wall 24L extends along both side edges located on both sides in the lateral direction of the vehicle 100 (i.e., the horizontal direction of FIG. 3) out of the peripheral edge of the left base plate 23L. This configuration increases the rigidity of the left reinforcing wall 24L. As a result, the left reinforcing wall 24L can further reduce the downward displacement of the bumper body 11b.

As shown in FIG. 3, the right bumper stay 22R is located on the right side of the left bumper stay 22L. That is, the bumper stays 22R, 22L are located next to each other in the lateral direction of the vehicle 100 (that is, the horizontal direction of FIG. 3). The right bumper stay 22R also includes a right reinforcing wall 24R extending in the vertical direction along the entire peripheral edge of a right base plate 23R. The bumper inner 20 supports the bumper body 11b on the body 6 by the bumper stays 22R, 22L. For example, in a configuration in which the bumper body 11b is supported on the body 6 only by the left bumper stay 22L, the left bumper stay 22L tends to be subjected to a twisting moment. Moreover, since a large load is applied to the left bumper stay 22L, it is necessary to more strongly reinforce the left bumper stay 22L. Supporting the bumper body 11b on the body 6 by the bumper stays 22R, 22L can reduce generation of a twisting moment and also reduce the load that is applied to the one bumper stay 22L. The front bumper 10 can thus be properly held in position.

As described above, the bumper body 11b and the bumper inner 20 of the front bumper 10 are made of resin. Therefore, the bumper body 11b and the bumper inner 20 more tend to be elastically deformed than the body 6 made of sheet metal. As shown in FIG. 4, there is a space in the longitudinal direction of the vehicle 100 between the bumper body 11b and the body 6. Accordingly, when an external force is applied to the front bumper 10 while the vehicle 100 is traveling, the resin front bumper 10 is deformed rearward into the space. The reaction force of the front bumper 10 to the external force is therefore small.

However, as described above, the bumper stays 22R, 22L of the bumper inner 20 firmly fix the bumper body 11b to the body 6. Moreover, since the inner body 20b extends along the inner surface of the bumper body 11b (i.e., the surface of the bumper body 11b located on the side closer to the viewer of FIG. 3) and is fixed to the base 13 of the bumper body 11b by the bolts 60, the inner body 20b supports the bumper body 11b from the inside. The inner body 20b also has high rigidity in order to reduce twisting at its both ends in the lateral direction of the vehicle 100. In the portion of the front bumper 10 in which the inner body 20b is interposed between the bumper body 11b and the body 6, the front bumper 10 has a double structure of the bumper body 11b and the inner body 20b. The front bumper 10 thus has increased rigidity in this portion. Particularly in the portion where the bumper stays 22R, 22L are located, the rigidity of the front bumper 10 is locally increased by both the inner body 20b and the bumper stays 22R, 22L. As a result, when an external force is applied to the front bumper 10, the reaction force to the external force may be locally large.

As shown in FIG. 3, the inner body 20b has the cut 21 along its lower edge directly below the bumper stays 22R, 22L. The edge of the cut 21 passes through a point P1 closest to the left bumper stay 22L, and extends in the lateral direction of the vehicle 100 (i.e., the horizontal direction of FIG. 3) while being displaced in the vertical direction. The cut 21 reduces the height of the inner body 20b. That is, the cut 21 reduces the sectional area of the inner body 20b. As a result, the overlapping area of the bumper body 11b and the inner body 20b is reduced, and the inner body 20b therefore has reduced rigidity in the portion where the cut 21 is formed. The cut 21 can thus prevent or restrain the overall rigidity of the bumper inner 20 including the inner body 20b and the bumper stays 22R, 22L from becoming locally high.

The cut 21 is located directly below the bumper stays 22R, 22L. In other words, the cut 21 is located near the bumper stays 22R, 22L. Therefore, even though the rigidity of the inner body 20b is reduced by the cut 21, the bumper stays 22R, 22L can compensate for the reduction in rigidity of the inner body 20b. Accordingly, even though the inner body 20b that is long in the lateral direction of the vehicle 100 (see FIG. 1) has the cut 21 near the bumper stays 22R, 22L, downward bending or twisting at both ends of the inner body 20b in the lateral direction of the vehicle 100 is less likely to be amplified.

The edge of the cut 21 passes through the point P1, and the cut 21 is continuous to a point P2 closest to the right bumper stay 22R. The overlapping area of the bumper body 11b and the inner body 20b between the bumper stays 22R, 22L is thus further reduced. The portion between the bumper stays 22R, 22L is affected by the bumper stays 22R, 22L. Accordingly, the rigidity of the inner body 20b of the bumper inner 20 tends to increase even at positions away from the point P1 closest to the bumper stay 22R and the point P2 closest to the bumper stay 22L. The rigidity of the front bumper 10 can therefore be properly reduced by forming the cut 21 that is continuous between the bumper stays 22R, 22L.

As shown in FIG. 3, the millimeter wave radar 30 is fixed to the base 13 of the bumper body 11b by three screws 34. Of the three screws 34, the screw 34 located on the uppermost position is tightened or removed through a maintenance hole 28 formed in the inner body 20b. A harness 32 is connected to the lower part of the millimeter wave radar 30. The harness 32 passes through an opening formed in the base 13 of the bumper body 11b and is placed on the outside of the base 13 (that is, the opposite side of the base 13 from the viewer of FIG. 3). The cut 21 exposes the lower part of the millimeter wave radar 30. More specifically, when the front bumper 10 is removed from the body 6, a worker who performs maintenance on the front bumper 10 can visually see a part of the millimeter wave radar 30 from the rear through the cut 21. For example, the worker can therefore remove the screws 34 fixing the millimeter wave radar 30 to the base 13 of the bumper body 11b, without removing the bumper inner 20 from the bumper body 11b. Moreover, when performing maintenance on the millimeter wave radar 30, the worker can check the state of the millimeter wave radar 30 without removing the bumper inner 20. The worker can also remove the harness 32 from the millimeter wave radar 30 without removing the bumper inner 20. That is, this configuration facilitates the maintenance of the millimeter wave radar 30.

Similarly, since the camera 40 is also exposed from the cut 21, the worker can remove screws 44 fixing the camera 40 to the base 13, without removing the bumper inner 20. That is, the worker can easily perform maintenance on the camera 40.

As shown in FIG. 4, the base 13 to which the electronic devices (i.e., the millimeter wave radar 30 and the camera 40) are fixed protrudes toward the inner body 20b. The base 13 is covered from the outside (i.e., the left side of FIG. 4) by the cover 11g. That is, the base 13 is not exposed to the outside due to the cover 11g. Accordingly, the position of the base 13 in the longitudinal direction of the vehicle 100 can be adjusted to the positions of the electronic devices 30, 40 regardless of the design shape of the front bumper 10. That is, flexibility in shape of the base 13 can be improved.

While the embodiment is described in detail above, the embodiment is merely illustrative, and is not intended to limit the scope of the claims. The technique defined in the claims includes various modifications and alterations of the specific example described above. Modifications of the above embodiment will be described below.

First Modification

In the above front bumper 10, the left reinforcing wall 24L is formed along the entire peripheral edge of the left base plate 23L. In this modification, the left reinforcing wall 24L need only be formed along a part of the peripheral edge of the left base plate 23L. For example, the left reinforcing wall 24L may be formed along only the peripheral edge on the right side of the left base plate 23L. In that case, the right reinforcing wall 24R may be formed along only the peripheral edge on the left side of the right base plate 23R.

Second Modification

In the above front bumper 10, the bumper inner 20 includes the pair of bumper stays 22R, 22L. In this modification, for example, the bumper inner 20 may include only one bumper stay in the middle in the lateral direction of the vehicle 100. In a further modification, the bumper inner 20 may include three or more bumper stays.

Third Modification

The cut 21 of the front bumper 10 is continuous from the point P1 to the point P2. In this modification, a first cut whose edge passes through the point P1 and a second cut whose edge passes through the point P2 may be formed along the lower edge of the inner body 20b.

Fourth Modification

In this modification, the cut 21 may be formed along the upper edge of the inner body 20b.

Fifth Modification

In this modification, the millimeter wave radar 30 and the camera 40 may not be exposed from the cut 21.

Sixth Modification

The bumper body 11b may not have the base 13. In that case, the millimeter wave radar 30 may be directly fixed to the back surface of the bumper body 11b.

Seventh Modification

The front bumper 10 may not include the cover 11g. In that case, the millimeter wave radar 30 may be directly fixed to the back surface of a part of the bumper body 11b that is exposed to the outside.

Eighth Modification

In this modification, the front bumper 10 may not include the millimeter wave radar 30 and the camera 40. That is, the electronic devices can be omitted. In a further modification, for example, an antenna that receives signals for remote control of the vehicle 100 may be disposed between the bumper body 11b and the inner body 20b, instead of the millimeter wave radar 30 or the camera 40.

While specific examples of the present disclosure are described in detail above, these examples are merely illustrative, and are not intended to limit the scope of the claims. The technique defined in the claims includes various modifications and alterations of the specific examples described above. The technical elements illustrated in this specification or the drawings has technical utility alone or in various combinations, and are not limited to the combinations described in the claims as originally filed. The technique illustrated in this specification or the drawings may achieve a plurality of objects at the same time, and has technical utility by achieving one of the objects.

What is claimed is:

1. A front bumper mounted on a front part of a vehicle, the front bumper comprising:
   a bumper body exposed to outside of the vehicle; and
   a bumper inner located inside the bumper body, wherein:
   the bumper inner includes:
      an inner body that extends in a lateral direction of the vehicle along an inner surface of the bumper body, and
      at least one bumper stay that extends from the inner body toward a body of the vehicle and that is fixed to the body;
   the at least one bumper stay includes:
      a base plate that is joined to the body, and
      a reinforcing wall that extends in a vertical direction from a peripheral edge of the base plate;
   the inner body includes a cut along either or both of upper and lower edges of the inner body that extend in the lateral direction, the cut extending in a range including a position closest to the at least one bumper stay, and
   the front bumper further comprises at least one electronic device located between the bumper body and the inner body, wherein at least a part of the at least one electronic device is exposed from the cut.

2. The front bumper according to claim 1, wherein the reinforcing wall extends along both side edges located on both sides in the lateral direction out of the peripheral edge of the base plate.

3. The front bumper according to claim 1, wherein the reinforcing wall extends along entirety of the peripheral edge of the base plate.

4. The front bumper according to claim 1, wherein the bumper inner includes a pair of the bumper stays located next to each other in the lateral direction.

5. The front bumper according to claim 4, wherein the cut is continuous from a position closest to one of the bumper stays to a position closest to another bumper stay.

6. The front bumper according to claim 1, wherein the cut is located along the lower edge of the inner body.

7. The front bumper according to claim 1, further comprising:
   a cover attached to the bumper body from the outside, wherein:
   the bumper body includes a base that protrudes toward the inner body;
   the at least one electronic device is fixed to the base; and
   the cover covers the base from the outside.

8. The front bumper according to claim 1, wherein the at least one electronic device includes a millimeter wave radar.

9. The front bumper according to claim 1, wherein the at least one electronic device includes a camera that captures an image of area in front of the vehicle.

* * * * *